United States Patent [19]

Rekers et al.

[11] 4,260,706

[45] Apr. 7, 1981

[54] OLEFIN POLYMERIZATION CATALYST

[75] Inventors: Louis J. Rekers, Wyoming; Stanley J. Katzen; Jerome H. Krekeler, both of Cincinnati, all of Ohio

[73] Assignee: National Petro Chemicals Corp., New York, N.Y.

[21] Appl. No.: 50,728

[22] Filed: Jun. 21, 1979

Related U.S. Application Data

[60] Division of Ser. No. 925,510, Jul. 7, 1978, Pat. No. 4,192,775, which is a continuation-in-part of Ser. No. 724,484, Sep. 20, 1976, which is a continuation-in-part of Ser. No. 558,504, Mar. 14, 1975, Pat. No. 3,984,351.

[51] Int. Cl.$^3$ ............................................. C08F 4/78
[52] U.S. Cl. ................................. 526/100; 252/428; 252/430; 252/431 P; 526/105; 526/106; 526/139; 526/145; 526/154; 526/155; 526/161; 526/352
[58] Field of Search ............... 526/100, 105, 106, 139, 526/145, 154, 155, 161

[56] References Cited

U.S. PATENT DOCUMENTS

| | | | |
|---|---|---|---|
| 2,825,721 | 3/1958 | Hogan et al. | 260/683.15 R X |
| 2,951,816 | 9/1960 | Hogan et al. | 252/467 |
| 3,324,095 | 6/1967 | Carrior et al. | 252/465 X |
| 3,324,101 | 6/1967 | Baker et al. | 252/431 R X |
| 3,474,080 | 10/1969 | Rekers | 252/431 P X |
| 3,484,428 | 12/1969 | Kallenbach | 252/430 X |
| 3,622,522 | 11/1971 | Horvath | 252/430 |
| 3,642,749 | 2/1972 | Johnson et al. | 252/431 R X |
| 3,652,214 | 3/1972 | Aboutboul et al. | 252/451 R X |
| 3,704,287 | 11/1972 | Johnson | 252/431 R X |
| 3,715,321 | 2/1973 | Horvath | 252/465 X |
| 3,780,011 | 12/1973 | Pullukat et al. | 252/430 X |
| 3,806,500 | 4/1974 | Karol | 252/431 R X |
| 3,984,351 | 10/1976 | Rekers et al. | 252/431 P X |
| 3,985,676 | 10/1976 | Rekers et al. | 252/430 X |
| 4,100,104 | 7/1978 | Katzen et al. | 252/431 P X |

*Primary Examiner*—Stanford M. Levin
*Attorney, Agent, or Firm*—Kenneth D. Tremain

[57] ABSTRACT

Olefin polymerization catalysts are prepared by depositing an organophosphoryl chromium product and an aluminum acetyl acetonate on an inorganic support material, and heating the support material in a non-reducing atmosphere at a temperature above about 300° C. up to the decomposition temperature of the support material.

6 Claims, No Drawings

OLEFIN POLYMERIZATION CATALYST

This is a division of application Ser. No. 925,510, filed July 7, 1978, now U.S. Pat. No. 4,192,775, which is a continuation-in-part of Ser. No. 724,484, filed Sept. 20, 1976, which is a continuation-in-part of Ser. No. 558,504, filed Mar. 14, 1975, now U.S. Pat. No. 3,984,351.

BACKGROUND OF THE INVENTION

The use of chromium compounds in the polymerization of olefins is well-known. U.S. Pat. Nos. 2,825,721 and 2,951,816 teach the use of $CrO_3$ supported on an inorganic material such as silica, alumina or combinations of silica and alumina and activated by heating at elevated temperatures to polymerize olefins. When these catalyst systems are used in various polymerization processes such as the well-known particle-form process, the resins produced, while useful in many applications, are unsatisfactory for others because of a deficiency in certain properties such as melt index.

Attempts to improve deficient properties of polyolefins produced using supported, heat-activated chromium oxide catalysts have been made by adding various metal and non-metal compounds to the supported chromium oxide prior to activation by heating. For example, in U.S. Pat. No. 3,622,522 it is suggested that an alkoxide of gallium or tin be added to supported chromium oxide prior to heat activation. U.S. Pat. No. 3,715,321 suggests adding a compound of a Group II-A or Group III-B metal to supported chromium oxide prior to heat treatment whereas U.S. Pat. No. 3,780,011 discloses adding alkyl esters of titanium, vanadium or boron and U.S. Pat. No. 3,484,428 discloses adding alkyl boron compounds.

In columns 5 and 6 and Table 1 of U.S. Pat. No. 3,622,522 the addition of aluminum isopropoxide to supported chromium oxide prior to heat activation is shown for purposes of comparison with the addition of an alkoxide of gallium or tin. The patentee concluded that the addition of the aluminum compound gave substantially the same or an increased HLMI/MI ratio of polymers produced as compared to the chromium oxide catalyst with no metal alkoxide added, whereas the addition of gallium or tin alkoxides produced polymers having a lower HLMI/MI ratio.

It is also known to utilize other chromium compounds as catalysts for the polymerization of olefins. Such compounds include various silyl chromate and polyalicyclic chromate esters as described, for example, in U.S. Pat. Nos. 3,324,095; 3,324,101; 3,642,749; and 3,704,287. The use of phosphorus-containing chromate esters in olefin polymerization catalysts has also been disclosed in the aforesaid U.S. Pat. No. 3,704,287; and in U.S. Pat. No. 3,474,080 and copending application Ser. No. 532,131, filed Dec. 16, 1974, now U.S. Pat. No. 3,985,676.

Use of the above chromium compound catalysts in Ziegler-type coordination catalyst systems has also been proposed. As is well-known in the art, such catalysts frequently additionally comprise organometallic reducing agents such as, for example, trialkyl aluminum compounds. Ziegler-type catalyst systems incorporating supported chromium compound catalysts and organometallic reducing agents, particularly organoaluminum compounds, are disclosed, for example, in U.S. Pat. Nos. 3,324,101; 3,642,749; 3,704,287; 3,806,500; and U.S. Pat. No. 3,985,676.

SUMMARY OF THE INVENTION

It has been discovered in accordance herewith that olefin polymers, of suitable properties e.g. melt indexes and melt index ratios, may be secured at acceptable productivity levels by utilization of an olefin polymerization catalyst system prepared by depositing an organophosphoryl chromium product and aluminum acetylacetonate compound on an inorganic support material and heating the supported chromium containing product and aluminum compound at a temperature above 300° C. up to the decomposition temperature of the support. The heat treated, supported chromium containing product and aluminum compound may be employed directly as an olefin polymerization catalyst. Polymers produced using the novel catalyst systems of the present invention have desirable flow properties and shear response.

DETAILED DESCRIPTION OF THE INVENTION

The novel catalyst systems of the present invention are prepared by depositing, on an inorganic support material having surface hydroxyl groups, aluminum acetylacetonate compound and an organophosphoryl chromium product. The supported chromium containing product and aluminum compound are then heated in a non-reducing atmosphere at a temperature above about 300° C. up to the decomposition temperature of the support material.

It is believed that the chromium containing product and the aluminum compound react with the surface hydroxyl groups on the inorganic support material during the course of preparing the novel catalyst systems of the present invention. However, the precise mechanism involved is not known and applicants do not wish to be restricted to the mechanism postulated above.

The inorganic support materials useful in the present invention include those normally employed in supported chromium catalysts used in olefin polymerizations such as those discussed in U.S. Pat. No. 3,825,721. Typically, these support materials are inorganic oxides of silica, alumina, silica-alumina mixtures, thoria, zirconia and comparable oxides which are porous, have a medium surface area, and have surface hydroxyl groups. Preferred support materials are silica xerogels or xerogels containing silica as the major constituent. Especially preferred are the silica xerogels described in U.S. Pat. No. 3,652,214 which silica xerogels have a surface area in the range of 200 to 500m$^2$/g, a pore volume greater than about 2.0 cc/g, a major portion of the pore volume being provided by pores having diameters in the range of 300 to 600 Å.

The chromium containing compounds useful in the present invention comprise the organophosphoryl chromium compounds disclosed in applicants U.S. Pat. No. 3,985,676 (incorporated herein by reference) which comprise the reaction product of chromium trioxide with an organophosphorus compound having the formula:

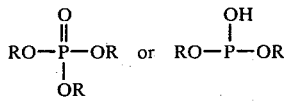

wherein R is alkyl, aralkyl, aryl, cycloalkyl or hydrogen, but at least one R is other than hydrogen. The preferred organophosphorus compounds are trialkyl phosphates such as triethyl phosphate.

The aluminum acetylacetonate for deposition on the inorganic support materials herein is commercially produced and widely available, including grades which can be advantageously employed in catalysis.

The novel catalysts of the present invention may be prepared by depositing the organophosphoryl chromium product and the aluminum compound on the inorganic support in any suitable manner such as by vapor coating or by impregnating the support with solutions thereof in a suitable inert solvent which is normally an anhydrous organic solvent. Such organic solvents include aliphatic, cycloalkyl, and alkylaryl hydrocarbons and their halogenated derivatives. A preferred organic solvent is dichloromethane. The chromium containing-product may be applied to the support first or the aluminum compound may be applied first or the chromium and aluminum compound may be applied together. In appliants' usual method of catalyst preparation, the support is impregnated first with the chromium-containing product and then the aluminum compound.

Preferably the organoaluminum compound may be applied to the catalyst support under conditions similar to those utilized for deposition of the organophosphoryl chromium compound.

The most effective catalysts have been found to be those containing the chromium in an amount such that the amount of Cr by weight based on the weight of the support is from about 0.25 to 2.5% and preferably is from about 0.5 to 1.25%, although amounts outside of these ranges still yield operable catalysts. The aluminum compound should be added in sufficient amounts to provide from about 0.1 to 10% of aluminum by weight based on the weight of the support and preferably from about 0.5 to 5.5% although other amounts ouside of these ranges can be used to prepare operable catalysts.

After the chromium containing product and the aluminum compound have been deposited on the inorganic support, the support is heated in a non-reducing atmosphere, preferably in an oxygen containing atmosphere, at a temperature above about 300° C. up to the decomposition temperature of the support. Typically, the supported compositions are heated at a temperature of from 500° to 1,000° C. The heating time may vary, for example, depending on the temperatures used, from ½ hour or less to 50 hours or more. Normally the heating is carried out over a period of 2 to 12 hours. The non-reducing atmosphere which is preferably air or other oxygen containing gas should be dry and preferably should be dehumidified down to a few parts per million (ppm) of water to obtain maximum catalyst activity. Typically, air used in the procedure described in this application is dried to less than 2-3 ppm of water.

It is also within the scope of the present invention to deposit the aluminum acetylacetonate upon the support followed by a first heat-activation step and thereafter to deposit the chromium compound upon the support followed by a second heat-activation step as in the double activation procedure described in copending and commonly assigned application Ser. No. 759,213, U.S. Pat. No. 4,100,104 incorporated herein by reference. Double activation of the catalysts herein has been observed to provide still further increases in polymer melt indexes.

In accordance with the alternative double activation treatment of the catalysts herein, the aluminum acetylacetonate is first deposited upon the support as in the above-described single activation procedure and the coated support is initially heated in a non-reducing atmosphere, preferably in a dry oxygen-containing atmosphere, at temperatures of at least about 130° C., and up to the decomposition temperature of the support. Typically, the aluminum acetylacetonate-coated support is heated at a temperature of from about 130° C. to about 1100° C., and preferably from about 260° C. to about 820° C. The period required for the initial heating operation varies, depending upon the temperatures utilized, from one-half hour or less, to about 50 hours or more, and normally, is effected over a period of from about 2 to about 12 hours. Double activation is completed by thereafter depositing the organophosphoryl chromium compound upon the aluminum-containing support in the manner previously described for the single activation procedure and heating the thus treated support in a preferably dry oxygen-containing atmosphere, at temperatures above about 430° C. up to the decomposition temperature of the support. Activation is suitably carried out at temperatures of from about 430° C. to about 1,100° C., best results having been obtained by activation at temperatures of from about 840° C. to about 990° C. Activation can be carried out in this, the final heating operation, for periods varying from about one-half hour or less to 50 hours or more, and most frequently, for periods varying from about 2 to about 12 hours.

The heat-treated supported chromium and aluminum materials of the present invention may be used directly as an olefin polymerization catalyst i.e., in the absence of a reducing agent as shown in the Examples. Such catalysts may also of course be employed in combination with metallic and/or non-metallic reducing agents as disclosed and claimed in parent Appln. Ser. No. 558,504, U.S. Pat. No. 3,984,351.

The catalyst compositions of this invention are amenable to use with conventional polymerization processes for olefins, in particular 1-olefins having 2–8 carbon atoms and are suitable for polymerization effected under temperature and pressure conditions generally employed in the art, e.g., temperatures of from about 40° C. to about 200° C. and preferably from about 70° C. to 110° C. and pressures of from 200 to 1,000 psig and preferably from 300 to 800 psig, as are used in slurry or particule form polymerizations.

CATALYST PREPARATION

I. Single Activation Procedure

A. Silica gel having a pore volume of about 2.5 cc/g prepared in accordance with the disclosure in U.S. Pat. No. 3,652,215 is added to a 2,000 ml, three-neck round bottom flask equipped with a stirrer, nitrogen inlet and y-tube with water condenser. A nitrogen atmosphere is maintained during the coating operation. Dichloromethane is then added to the flask containing the silica gel and stirring is commenced to insure uniform wetting of the gel. A dichloromethane solution of the reaction product of CrO₃ and triethyl phosphate prepared as described in U.S. Pat. No. 3,985,676 is then added to the flask in sufficient quantity to provide a dry coated catalyst containing about 1% by weight of Cr. The supernatant liquid is removed by filtration and the coated gel is dried in a rotary evaporator at 60° C. and with 29 inches of Hg vacuum.

B. Dichloromethane is added to a similar flask as used in Step A and while maintaining a nitrogen atmosphere stirring is commenced. To the flask is added the supported chromium composition prepared in step A above. A solution of dichloromethane and aluminum acetylacetonate is prepared in a pressure equalizing dropping funnel and the funnel attached to the stirred flask. The aluminum acetylacetonate solution is gradually added to the flask at the rate of 10 grams of solution per minute. After the addition of the solution is complete the slurry in the flask is stirred for about 1 hour. The supernatant liquid is removed by filtration and the coated gel is dried in a rotary evaporator at temperatures up to about 60° C. and 29 inches Hg vacuum. The amount of aluminum compound added depends on the % aluminum desired for the production of olefin polymers having specific properties necessary for certain end use applications. In this case, an amount of aluminum acetylacetonate is added to provided a dry coated catalyst containing 3.7% by weight of aluminum.

C. To heat activate the catalyst composition prepared in step B, the supported catalyst is placed in a cylindrical container and fluidized with dry air at 0.20 feet per second superficial lineal velocity while being heated to a temperature of 900° C. and held at this temperature for six hours. The activated supported catalyst is recovered as a powder.

II. Double Activation Procedure

A. The same procedure for preparing the dichloromethane slurry of silica gel in the abovedescribed single activation procedure is repeated (approximately 8 g dichloromethane per g of silica gel), however, omitting the deposition of the CrO₃ and triethyl phosphate reaction product.

B. A dichloromethane solution of aluminum acetylacetonate is deposited upon the wetted silica gel support of step A and the dry coated support is recovered in the same manner described in step B of the single activation procedure.

C. The aluminum acetylacetonate coated support is placed in a cylindrical container fluidized with dry air at 0.20 feet per second superficial lineal velocity while being heated in steps to a temperature of about 540° C. After six hours at this temperature, the initially activated catalyst is permitted to cool under nitrogen and then recovered as a free flowing powder.

D. The powder obtained in step C is re-slurried in dichloromethane as in step A and coated with a solution of the reaction product of CrO₃ and triethyl phosphate in dichloromethane in sufficient quantity to provide a dry coated gel containing about 0.9% by weight of Cr. The dichloromethane is then stripped from the coated gel under vacuum.

E. The aluminum-containing, chromium-containing gel of step D is heat-activated for a second time at 890° C. in the same manner as in step C of the single activation procedure.

In the following Table, a series of polymerizations were carried to illustrate the results obtained from employing a chromium-containing catalyst prepared with aluminum acetylacetonate modifier in accordance with the single and double activation procedures described herein, and chromium-containing catalysts heretofore employed in the preparation of olefins.

TABLE

| Catalyst[a] Example | H₂ (psi) | Productivity (g polyethylene/g cat. hr) | MI[d] | Powder Resin Properties HLMI[c]/MI |
|---|---|---|---|---|
| 1. Reaction product of CrO₃ and triethyl phosphate | 30 | 800 | 0.26 | 98 |
|  | 120 | 400 | 0.48 | 88 |
| 2. Same as Example 1 but modified with aluminum sec-butoxide. | 30 | 760 | 7.2 | 90 |
|  | 120 | 750 | 20 | — |
| 3. Same as Example 1 but modified with aluminum acetylacetonate as in the Single Activation Procedure herein | 30 | 527 | 8.5 | 63 |
|  | 30 | 459 | 8.8 | 68 |
|  | 30 | 889 | 8.1 | 70 |
|  | 120 | 675 | 30.4 | — |
|  | 120 | 626 | 157 | — |
|  | 120 | 600 | 22.4 | — |
|  | 120 | 385 | 35.1 | — |
| 4. Same as Example 2 but double activated.[b] | 30 | 748 | 38 | — |
|  | 120 | (c) | — | — |
| 5. Same as Example 3 but double activated as described herein.[b] | 30 | 593 | 17.0 | — |
|  | 30 | 580 | 20.6 | — |
|  | 30 | 396 | 45.6 | — |
|  | 30 | 706 | 15.9 | — |
|  | 120 | 543 | 43 | — |
|  | 120 | 630 | 20.2 | — |
|  | 120 | 869 | 27 | — |
|  | 120 | 731 | 28.4 | — |

[a]Al modifications at 3.7 wt.%
[b]Silica gel coated with Al compound was pre-calcined at 540° C.
[c]No data available
[d]Melt Index, ASTM-D-1238, Condition E
[e]High Load Melt Index, ASTM-D-1238, Condition F
Reactor Conditions
reactor temperature 210° F.
isobutane solvent
ethylene 10 mole percent
triethyl borane (15% in hexane)
at 0.5 cc per g catalyst According to the above data, the aluminum acetylacetonate modified catalysts of this invention (Examples 3 and 5) possess good productivity and levels of hydrogen response comparable to those provided by the aluminum sec-butoxide modified catalysts (Examples 2 and 4). The HLMI/MI ratios of the polyethylenes obtained with the catalysts of this invention are lower than those obtained with the catalysts of Examples 1 and 2 indicating a narrower molecular weight distribution for the polyethylenes herein.

What is claimed is:

1. A process for polymerizing an olefin which comprises contacting the olefin with a catalyst system produced by
   (a) depositing an organophosphoryl chromium reaction product of chromium trioxide and a phosphorus compound having the formula

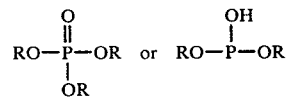

wherein R is alkyl, aralkyl, aryl, cycloalkyl, or hydrogen but at least one R is other than hydrogen, upon a solid inorganic support material;
   (b) depositing aluminum acetylacetonate upon said support material; and,
   (c) heat-activating said supported organophosphoryl chromium reaction product and aluminum acetylacetonate in a non-reducing atmosphere at a temperature above about 300° C. up to the decomposition temperature of the support material.

2. The process of claim 1 wherein the aluminum acetylacetonate is first deposited upon the support material and the thus treated support is heat-activated in a non-reducing atmosphere at a temperature of at least about 130° C. up to the decomposition temperature of the support and the organophosphoryl chromium reaction product is thereafter deposited upon the support and the thus treated support is again heat-activated but at a temperature above about 300° C. up to the decomposition temperature of the support.

3. The process of claim 1 or 2 wherein a metallic and/or non-metallic reducing agent is added to the heat-activated catalyst.

4. The process of claim 3 wherein hydrogen gas is present in the reaction medium.

5. The process of claim 3 wherein the olefin is ethylene.

6. The process of claim 3 wherein the olefin is ethylene.

* * * * *